United States Patent Office 3,560,325
Patented Feb. 2, 1971

3,560,325
PACKAGING LAMINATE FILM COMPRISING POLYETHYLENE AND ETHYLENE/VINYL ALCOHOL COPOLYMER
Hidenobu Sogi, Teiichiro Chiba, and Katsuaki Hirano, Kurashiki, Japan, assignors to Kurashiki Rayon Co., Ltd., Kurashiki, Japan
No Drawing. Filed June 17, 1968, Ser. No. 737,335
Claims priority, application Japan, June 17, 1967, 42/38,974
Int. Cl. B32b *27/08, 27/30;* C08j *1/40*
U.S. Cl. 161—165                                                7 Claims

ABSTRACT OF THE DISCLOSURE

Laminate film free from tendency of breakage at any boundary portions of heat sealing is prepared by laminating 10–100μ thick film of ethylene/vinyl alcohol copolymer with ethylene content (X) of 20–45 mol percent, saponification of at least 97% and intrinsic viscosity of 0.05–0.20 l./g. on 10–100μ thick polyethylene film and subjecting, before or after the above lamination, the ethylene/vinyl alcohol copolymer film to heat treatment for 1–60 seconds at a temperature (Y° C.) within the range expressed by the formula $$139.3 - 0.72X \leq Y \leq 221.7 - 1.59X$$

---

This invention relates to a packaging laminate film, and particularly, to a packaging laminate film comprising polyethylene and an ethylene/vinyl alcohol copolymer.

Films prepared from an ethylene/vinyl alcohol copolymer differ in property according to the ethylene content, saponification degree and molecular weight of the copolymer, but generally have such advantages as impermeability to oxygen, good resistance to oil, and stiffness. The use of films from such ethylene/vinyl alcohol copolymer for packing foodstuffs, therefore, can preserve the taste, colour and flavour of foodstuffs for a long period of time. These films, however, are very water-and moisture-permeative. When water products are packed with such films, their water content will decrease, and when dry products are packed with these films, they absorb moisture to degrade their value. This defect of water- and moisture-permeability can be eliminated by laminating a polyolefine film having small moisture-permeability such as polyethylene and polypropylene films onto the ethylene/vinyl alcohol copolymer film. As the result, the advantages mentioned above of an ethylene/vinyl alcohol copolymer film are retained.

It was found however that a laminate film of an ethylene/vinyl alcohol copolymer and polyolefine obtained by an ordinary method has such a defect that when it is made into a flexible package by heat-sealing, it tends to be broken at the boundary portions of the heat-sealing by the action of vibration or impact during transportation of a material packed therein. Such a phenomenon is peculiar to films of an ethylene/vinyl alcohol copolymer, and is not seen in such films as polyethylene film, polypropylene film, hard vinyl resin film and regenerated cellulose film.

We have investigated into the cause of such a phenomenon, and found that a local crystallisation occurs owing to the heat applied in heat-sealing the laminate film whereby the properties of the ethylene/vinyl alcohol copolymer come to differ between the heat-sealed portions and the portions in their vicinity, and therefore, that stress is concentrated on the boundary portions of the heat sealing. Based on this finding, we have made extensive researches concerning the production of film packages which will be free from the above-mentioned phenomenon. These researches have led to the discovery that film packages or containers free from a tendency of breakage at the boundary portions of the heat-sealing can be obtained form a laminate film of specific properties composed of polyethylene and an ethylene/vinyl alcohol copolymer which has been heat-treated under specific conditions.

An object of this invention is to provide a laminate film consisting of polyethylene and an ethylene/vinyl alcohol copolymer which has a small oxygen- and water-permeability, good resistance to oil, and toughness, and is free from a tendency of breakage at the boundary portions of heat-sealing.

Another object of the invention is to provide an improved laminate film consisting of polyethylene and an ethylene/vinyl alcohol copolymer which is suitable for being made into packages by heat-sealing because of the excellent characteristics mentioned above.

The "making of packages or containers by heat-sealing," as used in the present invention, means the making of closed packages or containers or the making of partly open packages or containers which have heat-sealed portions. The "heat-sealing" used in the invention therefore includes that used at the time of making partly open bags before packing goods, that used at the time of closing an open portion of a bag made by using an adhesive after packing goods therein, and that used at the time when both bag making and packing of goods are effected simultaneously.

The laminate film of the invention is an integrally laminated film of a polyethylene film having a thickness of 10–100μ and an ethylene/vinyl alcohol copolymer film having a thickness of 10–100μ. The ethylene/vinyl alcohol copolymer film consists of a copolymer having an intrinsic viscosity of 0.05–0.20 l./g. obtained by saponifying a copolymer consisting of 20–45 mole percent of ethylene and the remainder being vinyl acetate whereby at least 97% of the vinyl acetate units is saponified; and has been heat-treated for 1–60 seconds at a temperature within the range expressed by the following formula $$139.3 - 0.72X \leq Y \leq 221.7 - 1.59X$$

wherein Y is a temperature in ° C. to which the ethylene/vinyl alcohol copolymer film is subjected, and X is a content in mole percent of ethylene in the ethylene/vinyl alcohol copolymer.

Now, the invention will be described further in detail.

The ethylene/vinyl alcohol copolymer used in the present invention may be obtained by saponifying a copolymer of ethylene with a vinyl ester such as vinyl acetate and vinyl propionate. Vinyl acetate is mostly used ordinarily as the vinyl ester. The ethylene/vinyl alcohol copolymer includes copolymers obtained by saponifying copolymers of ethylene, vinyl ester and a small amount of other copolymerisable monomer.

As the polyethylene used in the invention, ethylene homopolymers are most preferable. Of these, low density polyethylenes having a melt index [measured in accordance with the procedure identified as ASTM D1238(E)] of 0.2–30 g./10 min. and a melting point of about 108–120° C. are most effective, though medium and high density polyethylenes are also usable. The polyethylenes of the invention also include copolymers consisting predominantly of ethylene and containing a minor amount of a monomer copolymerisable with the ethylene. Examples of the copolymerisable monomer are olefines and vinyl monomers.

Polyethylene is laminated onto the ethylene-vinyl alcohol copolymer by various laminating procedures, among which are:

Method in which a polyethylene film is bonded to an ethylene/vinyl alcohol copolymer film by means of an adhesive;

Method in which a polyethylene resin is melt-extruded onto a film of an ethylene/vinyl alcohol copolymer to effect lamination, with an optional step of applying to the copolymer film a adhesion promotor or primer such as an organotitanium compound, for instance, tetra-n-butyl titanate, tetra-iso-propyl titanate or tetra-stearyl titanate;

Method in which an ethylene/vinyl alcohol copolymer is melt-extruded onto a polyethylene film to effect lamination, with an optional step of subjecting the surface of polyethylene film to oxidation treatment; and Method in which polyethylene and an ethylene/vinyl alcohol copolymer are simultaneously extruded to effect lamination.

In order to obtain the laminate film of the invention, the ethylene/vinyl alcohol copolymer should be an ethylene/vinyl alcohol copolymer having an ethylene content of 20–45 mole percent, a saponification degree of vinyl ester of at least 97%, and an intrinsic viscosity of 0.05–0.2 l./g. as measured at 30° C. with the use of a mixed solvent consisting of 15% by weight of water and 85% by weight of phenol. It is also necessary for this purpose to adjust the thickness of the ethylene/vinyl alcohol copolymer film to 10–100μ, preferably 15–50μ, and that of the polyethylene film to 10–100μ, preferably 20–70μ.

These limitations are critical, and as will be evident from comparative examples which are given later in the pages, laminate films made by using ethylene/vinyl alcohol copolymers outside these limitations, even when heat-treated in accordance with the invention, cannot become films having excellent properties as mentioned above. If the ethylene content of the ethylene/vinyl alcohol copolymer of the invention is less than 20 mole percent or its intrinsic viscosity exceeds 0.2 l./g., the film-forming temperature of the ethylene/vinyl alcohol copolymer becomes high and nears its decomposition temperature. For this reason, the film tends to undergo heat decomposition, and it is impossible to convert it into a good film. On the other hand, ethylene/vinyl alcohol copolymers having an ethylene content in excess of 45 mol percent a saponification degree of less than 97% are low in melting point, inferior in mechanical characteristics, and are difficult to laminate onto polyethylene. Also, laminate films from these copolymers have bad heat-sealability and mechanical characteristics. Particularly, if the saponification degree is less than 97%, oxygen is permeated through the resulting film to a greater degree, and there is no advantage of making packages or containers by using an ethylene/vinyl alcohol copolymer. Ethylene/vinyl alcohol copolymers with an intrinsic viscosity of less than 0.05 l./g. are inferior in mechanical characteristics and are unsuitable as materials for packages or containers.

With regard to the thickness of the film, ethylene/vinyl alcohol copolymer films having a thickness of less than 10μ tend to give rise to pin holes in the resulting laminate films, and there is much permeation of oxygen. If the thickness of the polyethylene film is less than 10μ, it is difficult to laminate it onto the ethylene/vinyl alcohol copolymer, and tends to cause pin holes and increased moisture-permeability. If the polyethylene or ethylene/vinyl alcohol copolymer film is made thicker in excess of 100μ, it is difficult to carry out heat-sealing economically.

As one of the important features of the invention, the film of the ethylene/vinyl alcohol copolymer is heat-treated at a temperature within the range expressed by the following formula $$139.3 - 0.72X \leq Y \leq 221.7 - 1.59X \quad (1)$$

wherein Y is a temperature in ° C. to which the ethylene/vinyl alcohol copolymer film is subjected, and X is a content in mole percent of ethylene in the ethylene/vinyl alcohol copolymer. The heat-treatment is usually effected by contacting the ethylene/vinyl alcohol copolymer film which has been, or is to be, laminated, with a heated roll or hot wind. The heat-treatment temperature represented by Y in the Formula 1 is a temperature of the surface of a heated roll when the heat-treatment is effected by contacting the film to the heated roll, and is a temperature of hot wind at a point about 10 mm. away from the surface of the ethylene/vinyl alcohol copolymer film when the heat-treatment is carried out by hot wind.

If the heat-treatment temperature is as low as that within the range expressed by $Y < 139.3 - 0.72X$, the heat-treatment of the film is insufficient even by heating for a very long time, and it is difficult to obtain packages or containers which are free from a tendency of breakage at the boundary portions of heat-sealing during transportation or when dropped. On the other hand, when heating is done at too high a temperature, the ethylene/vinyl alcohol copolymer becomes almost molten and undergoes heat deformation. It is difficult therefore to obtain a uniform film and to laminate it with polyethylene. It has been found that heat-treatment at a temperature as high as that within the range expressed by $Y > 221.7 - 1.59X$ is generally difficult. The heat-treatment temperature of the invention should therefore be within the range expressed by the formula $$139.3 - 0.72X \leq Y \leq 221.7 - 1.59X$$

The optimum heat-treatment temperature is determined in relation to the optimum heat-treatment time in an industrial process. When the temperature is determined and the time is chosen accordingly, the treating time should preferably be determined in accordance with the formula $$Y \geq 139.3 - 0.72X + \frac{164.7 - 1.74X}{t+1}$$

(wherein $t$ is a heat-treating time in second).

A simplified way of determining a preferable heat-treating time to be given in relation to the used heat-treating temperature is as follows:

At least 5 seconds at a temperature in the vicinity of $Y = 166.8 - 1.01X$;

At least 2 seconds at a temperature in the vicinity of $Y = 194.3 - 1.30X$;

At least 1 second at a temperature in the vicinity of $Y = 221.7 - 1.59X$.

To prolong the heat-treating time more than necessary does not cause defects in properties, but is disadvantageous for commercial practice. For commercial practice, a treating time within 60 seconds is especially advantageous.

The heat-treating temperature of the invention should be within the range expressed by the above Formula 1, but the optimum heat-treating temperature differs depending on the ethylene content and other factors such as saponfication degree, molecular weight and the thickness of the film with the effect of the ethylene content being greatest, and other factors little, as compared with it, at least within the range specified above.

It is easy for those skilled in the art to determine the optimum heat-treating temperature for a film of an ethylene/vinyl alcohol copolymer of a given ethylene content, saponification degree and thickness. Generally, the optimum treating temperature is in the range of $$170 - X \leq Y \leq 180 - X$$

(wherein X and Y have the same meanings as defined in Formula 1).

Heat-treatment of the ethylene/vinyl alcohol copolymer film may be effected either before or after a laminating procedure, and is to be chosen according to the laminating method employed. For instance, if a film of the ethylene/vinyl alcohol copolymer is laminated, heat-treatment can be effected either before or after the laminating operation. It is preferable however to heat-treat the ethylene/vinyl alcohol copolymer film alone before the laminating operation. When the ethylene/vinyl alcohol copolymer is laminated by extrusion, heat-treatment is effected after lamination.

When packages are made by heat-sealing the laminate film of the invention, it is of particular importance to heat-treat the ethylene/vinyl alcohol copolymer in film form prior to package making. It is not until this heat-treatment is effected that a film package free from a tendency of breakage at the boundary portions of heat-sealing can be prepared.

Various apparatuses can be employed for the heat-treatment such as a tenter type heat-treating apparatus, roll heat-treating apparatus and hot wind circulating heat-treating apparatus. Stretching of a film in a transverse direction can lead to the removal of the anisotropy of the film.

Heat-sealing is carried out by means of an ordinary heat-sealer such as a bar type heat-sealer and impulse heat-sealer by contacting two laminate films of polyethylene and an ethylene/vinyl alcohol copolymer with the polyethylene layers facing each other. The sealing pressure is ordinarily about 0.2 to 2 kg./cm.$^2$, and the sealer temperature is 100-200° C. As will become apparent from the comparative examples which will follow later, the removal of a defect of breakage at the boundary portions of heat-sealing which is peculiar to a film of an ethylene/vinyl alcohol copolymer can be made only by effecting the heat-treatment of the invention either before or after the lamination of a polyethylene film and the said copolymer film. It should be noted that a mere heat-treatment of an ethylene/vinyl alcohol copolymer film alone hardly leads to the elimination of the above-mentioned defect unless the copolymer film is laminated with polyethylene film.

It has been acknowledged that the incorporation of a plasticizer into the ethylene/vinyl alcohol copolymer film is one way of removing the above-mentioned defect, and it has proved to be effective to some extent, but since the incorporation of a plasticizer results in the increase of oxygen-permeability of the ethylene/vinyl alcohol copolymer film or difficulty in the laminating operation, incorporation of a plasticizer into the laminate film of the invention is not preferred.

If necessary, a polypropylene or polyester film may be laminated in one or more layers onto the so prepared laminate film of the invention at the surface of the ethylene/vinyl alcohol copolymer film whose side is not in contact with the polyethylene film, to make a three or more layered laminate film.

Because of a small oxygen-permeability, the laminate film of the invention is useful as a packaging material for foodstuffs, such as miso (bean paste, typical Japanese seasoning), mayonnaise, pickle and ketchup, which will be discoloured or deteriorated by oxygen. It is also suitable for packaging foodstuffs, such as soy bean sauce, curry powder, green tea and cheese, desired to be free from loss of flavour or such drugs as camphor. The laminate film of the invention is also suitable, because of its small permeability, for water products (liquid-containing products) such as pickle, ketchup, juice and jam, and dry products such as powder juice, laver, cooky, biscuit and black tea. Furthermore, its good resistance to oil makes it suitable for packaging such oily foodstuffs as mayonnaise, doughnut and dressing or oil-adhering machine parts such as bolts and ball bearings.

The invention will now be described by examples which in no way limit the invention.

The testing methods used in the examples are as follows:

(1) BAG MAKING AND PACKING TEST

With the use of an automatic packing machine (bar type sealer) (model KBF-3, product of Kawashima Seisakusho, 16-32, 4-chome, Negishicho, Taito-ku, Tokyo), the laminate film was subjected to the steps of bottom sealing, side sealing, packing, closing, cutting and delivering in the order mentioned. In the packing step, 300 g. of miso was packed into a bag of a size of 10 x 15 cm. The packing and delivering were conducted vertically by utilizing the own weight of the contents. If the laminate film is defective in heat stability, heat-sealability and mechanical strength, defective bags, such as those which are badly bonded at the sealed portion, cut by melting, elongated by tension at the sealed portion, cut at the boundary line of the sealed portion, or of bad appearance are produced in the process of automatic packing. The amount of these defective bags is expressed in terms of defect ratio in the following examples without referring to the cause of defects.

(2) TRANSPORTATION TEST

Only good sample were chosen from the miso-packed bags which were prepared in the bag making and packing test. Twenty-four of such samples were packed into each case of corrugated cardboard having a capacity of about 15 x 20 x 40 cm., and were transported in a lorry by the national highway from Kurashiki to Osaka covering about 200 km. The breakage of bags ascribable to this transportation was examined. The bags were broken either at the boundary line of the sealed portion or at other portions. The breakage ratio in each instance was expressed in percentage of broken bags as against the total of the samples.

(3) FALLING TEST

The above-mentioned samples packed with miso were packed into cases of corrugated cardboard in the same manner as in the transportation test, and were left to fall by their own weight from the height of 80 cm. at 5° C. onto the concrete floor. The breakage was examined, and expressed by the breakage ratio in the same manner as in the transportation test.

Furthermore, in the examples, the following abbreviations are used:

EVA: an ethylene/vinyl alcohol copolymer obtained by saponifying an ethylene/vinyl acetate copolymer (this copolymer was used in all the examples);
PE: polyethylene;
$Y_{min}$: the minimum value of the heat-treating temperature calculated from the Formula 1;
$Y_{max}$: the maximum value of the heat-treating temperature calculated from the Formula 1.

EXAMPLE 1

An ethylene/vinyl alcohol copolymer having an ethylene content of 25 mole percent, a saponification degree of 98.4% and an intrinsic viscosity of 0.120 l./g. was shaped into a film having a thickness of 25$\mu$ through an extruder at 210° C. using a flat die. The film was heat-treated by a tenter type heat-treating apparatus under the conditions indicated in Table 1, and coated with tetra-n-butyl titanate. A low density polyethylene having a melt index of 7.0 was extruded at 300° C. in a thickness of 70$\mu$ and laminated onto the EVA film. The laminate film was made into bags at a sealer temperature of 155° C., followed by packing. The results of the transportation test and the falling test are shown in Table 1.

TABLE 1

| Heat-treatment temperature, °C. for EVA | (1) | 115 | 130 | 140 | 150 | 160 | 165 | 180 | 185 |
|---|---|---|---|---|---|---|---|---|---|
| Heat-treatment time, seconds for EVA film | (1) | 100 | 15 | 6 | 4 | 4 | 3 | 1 | 1 |
| Condition at the time of heat-treatment | | Good | Good | Good | Good | Good | Good | Good | Bad |
| Defect ratio at the time of bag making and packaging percent | 80 | 7 | 0 | 0 | 0 | 0 | 0 | 0 | |
| Breakage ratio at the time of the falling test, percent | 100 | 10 | 0 | 0 | 0 | 0 | 0 | 0 | |
| Breakage at the boundary line of sealed portion | 80 | 10 | 0 | 0 | 0 | 0 | 0 | 0 | |
| Breakage of other parts | 20 | 0 | 0 | 0 | 0 | 0 | 0 | 0 | |
| Breakage ratio at the time of the transportation test, percent | 80 | 10 | 0 | 0 | 0 | 0 | 0 | 0 | |
| Breakage at the boundary line of sealed portion | 80 | 10 | 0 | 0 | 0 | 0 | 0 | 0 | |
| Breakage of other parts | 0 | 0 | 0 | 0 | 0 | 0 | 0 | 0 | |

[1] Not heat-treated.

NOTE.—$Y_{min.} = 121.3°$ C., $Y_{max.} = 181.9°$ C.

Heat-treatment as 185° C. made the EVA film almost molten, and caused heat deformation. It was impossible to obtain a smooth film. Heat-treatment at 115° C. gave unsatisfactory results. On the other hand, the films heat-treated at 130–180° C. which are within the range expressed by the Formula 1 were smooth and had good appearance. The laminate films from them were strong, and could be made into bags with ease.

EXAMPLE 2

Example 1 was repeated, except that an ethylene/vinyl alcohol copolymer having an ethylene content of 33 mole percent, a saponification degree of 99.0% and an intrinsic viscosity of 0.110 l./g. was used under the heat-treating conditions indicated in Table 2. The results are shown in Table 2.

TABLE 2

| Heat-treatment temperature, °C. for EVA | (1) | 110 | 125 | 135 | 140 | 150 | 155 | 165 | 170 |
|---|---|---|---|---|---|---|---|---|---|
| Heat-treatment time, seconds for EVA film | (1) | 110 | 20 | 10 | 6 | 6 | 3 | 1 | 1 |
| Condition at the time of heat-treatment | | Good | Good | Good | Good | Good | Good | Good | Bad |
| Defect ratio at the time of bag making and packaging, percent | 82 | 15 | 0 | 0 | 0 | 0 | 0 | 0 | |
| Breakage ratio at the time of the falling test, percent | 100 | 20 | 0 | 0 | 0 | 0 | 0 | 0 | |
| Breakage at the boundary line of sealed portion | 70 | 20 | 0 | 0 | 0 | 0 | 0 | 0 | |
| Breakage of other parts | 30 | 0 | 0 | 0 | 0 | 0 | 0 | 0 | |
| Breakage ratio at the time of the transportation test, percent | 75 | 15 | 0 | 0 | 0 | 0 | 0 | 0 | |
| Breakage at the boundary line of sealed portion | 60 | 10 | 0 | 0 | 0 | 0 | 0 | 0 | |
| Breakage of other parts | 15 | 5 | 0 | 0 | 0 | 0 | 0 | 0 | |

[1] Not heat-treated.

NOTE.—$Y_{min.} = 115.6°$ C., $Y_{max.} = 169.2°$ C.

Heat-treatment at 170° C. made the EVA film almost molten, and caused heat deformation. It was impossible to obtain a smooth film. Heat-treatment at 110° C. gave unsatisfactory results. On the other hand, the films heat-treated at 125–155° C. were smooth and had good appearance. The laminate films from them were strong, and could be made into bags with ease.

EXAMPLE 3

An ethylene/vinyl alcohol copolymer having an ethylene content of 42 mole percent, a saponification degree of 98.5% and an intrinsic viscosity of 0.097 l./g. was shaped into a film having a thickness of 30μ through an extruder at 180° C. using a flat die. The film was coated with tetra-n-butyl titanate, and a low density polyethylene having a melt index of 5.0 was extruded at 300° C. in a thickness of 60μ and laminated onto it. While the polyethylene surface of the laminate film was contacted with a drum cooled to 30° C., hot wind was blown against the ethylene/vinyl alcohol copolymer surface. The so treated laminate film was heat-treated, and made into bags at a sealer temperature of 145° C., followed by packing. The results of the transportation test and the falling test are given in Table 3.

TABLE 3

| Heat-treatment temperature, °C. for EVA | (1) | 100 | 120 | 125 | 130 | 140 | 145 | 150 | 158 |
|---|---|---|---|---|---|---|---|---|---|
| Heat-treatment time, seconds for EVA film | (1) | 120 | 40 | 10 | 6 | 6 | 3 | 2 | 1 |
| Condition at the time of heat-treatment | | Good | Good | Good | Good | Good | Good | Good | Bad |
| Defect ratio at the time of bag making and packaging, percent | 81 | 15 | 0 | 0 | 0 | 0 | 0 | 0 | |
| Breakage ratio at the time of the falling test, percent | 100 | 20 | 0 | 0 | 0 | 0 | 0 | 0 | |
| Breakage at the boundary line of sealed portion | 55 | 10 | 0 | 0 | 0 | 0 | 0 | 0 | |
| Breakage of other parts | 45 | 10 | 0 | 0 | 0 | 0 | 0 | 0 | |
| Breakage ratio at the time of the transportation test, percent | 65 | 15 | 0 | 0 | 0 | 0 | 0 | 0 | |
| Breakage at the boundary line of sealed portion | 45 | 10 | 0 | 0 | 0 | 0 | 0 | 0 | |
| Breakage of other parts | 20 | 5 | 0 | 0 | 0 | 0 | 0 | 0 | |

[1] Not heat-treated.

NOTE.—$Y_{min} = 109.1°$ C., $Y_{max.} = 154.9°$ C.

Heat-treatment at 158° C. did not give a film of smooth surface owing to heat-deformation. Heat-treatment at 100° C. gave unsatisfactory results. The laminate films heat-treated at 120–145° C. were good in appearance and strength and could be made into bags with ease.

EXAMPLE 4

An ethylene/vinyl alcohol copolymer having an ethylene content of 43.0 mole percent, a saponification degree of 98.6% and an intrinsic viscosity of 0.098 l./g. was shaped into a film having a thickness of 22μ through an extruder at 180° C. using a flat die. The film was heat-treated for 5 seconds at 130° C. by a tenter type heat-treating apparatus, and then coated with a mixture of tetra isopropyl titanate with tetra stearyl titanate. A low density polyethylene having a melt index of 7 was extruded at 280° C. in a thickness of 40μ, and laminated onto it. The laminate film was made into bags at a sealer temperature of 145° C., followed by packing. The defect ratio was 0%. The transportation test and the falling test indicated that the breakage ratio was 0% in each instance.

EXAMPLE 5

The same ethylene/vinyl alcohol copolymer as used in Example 4 was shaped into a film having a thickness of 22μ through an extruder at 180° C. using a flat die. The film was heat-treated for 6 seconds at 145° C. by means of a tenter-type heat-treating apparatus. A polyethylene film having a thickness of 40μ was laminated onto the EVA film in the same manner as in Example 4. The laminate film was made into bags at a sealer temperature of 160° C., followed by packing. The defect ratio was 0%. The transportation test and the falling test indicated that the breakage ratio was 0% in each instance.

EXAMPLE 6

An ethylene/vinyl alcohol copolymer having an ethylene content of 31.0 mole percent, a saponification degree of 98.3% and an intrinsic viscosity of 0.105 l./g. was shaped into a film having a thickness of 20µ through an extruder at 210° C. using a flat die. The film was heat-treated for 3 seconds at 160° C. by means of a tenter-type heat-treating machine. A low density polyethylene having a melt index of 5 was extruded at 320° C. in a thickness of 40µ and laminated onto the so treated EVA film. The laminate film was made into bags at a sealer temperature of 185° C., followed by packing. The defect ratio was 0%. The transportation test and the falling test indicated that the breakage ratio was 0% in each instance.

EXAMPLES 7-11

The ethylene/vinyl alcohol polymers shown in Table 4 were made into films having a thickness of 20µ under the same conditions as in Example 6. Polyethylene films having a thickness of 40µ were laminated onto the EVA films. Bag making and packing test was conducted at various heat-sealing temperatures indicated in Table 4. The transportation test and the falling test were also conducted. The results are shown in Table 4.

COMPARATIVE EXAMPLES 8-10 AND EXAMPLE 13

Heat-treatment of an ethylene/vinyl alcohol copolymer film alone cannot lead to the removal of the defect inherent to this copolymer, that is its tendency to break at the boundary portions of the heat-sealing. The removal is achieved only when a film of the said copolymer is laminated onto a polyethylene film, and the heat-treatment is carried out either before or after the lamination. This will be made clear by these comparative examples and example.

An ethylene/vinyl alcohol copolymer having an ethylene content of 31 mole percent, a saponification degree of 98.5% and an intrinsic viscosity of 0.11 l./g. was shaped into a film having a thickness of 25µ through an extruder at 220° C. using a flat die. Heat-treatment was carried out for 25 seconds at 140° C. by means of a tenter-type heat-treating machine. In the laminating operation, a low density polyethylene having a melt index of 5.0 was extruded at 300° C. in a thickness of 90µ, and laminated onto the EVA film coated with a mixture of tetraisopropyl

TABLE 4

|  | Example | 7 | 8 | 9 | 10 | 11 |
|---|---|---|---|---|---|---|
| Ethylene/vinyl alcohol copolymer | Ethylene content mol percent. | 31.0 | 31.0 | 22.5 | 22.5 | 22.5 |
|  | Saponification degree, percent. | 98.3 | 98.3 | 97.2 | 97.2 | 97.2 |
|  | Intrinsic viscosity, liter/gram. | 0.105 | 0.105 | 0.112 | 0.112 | 0.112 |
| Heat-treating conditions | Heat-treating temperature, ° C. | 170 | 125 | 185 | 165 | 130 |
|  | Heat-treating time, seconds. | 1 | 60 | 2 | 3 | 40 |
| Heat-sealing conditions | Heat-sealing temperature, ° C. | 180 | 185 | 190 | 190 | 190 |
| Test | Bag making and packaging test defect ratio, percent. | 0 | 0 | 0 | 0 | 0 |
|  | Transportation test breakage ratio, percent. | 0 | 0* | 0 | 0 | 0 |
|  | Falling test breakage ratio, percent. | 0 | 0 | 0 | 0 | 0 |

COMPARATIVE EXAMPLES 1-7 AND EXAMPLE 12

These comparative examples will show that, if the ethylene/vinyl alcohol copolymers are outside the definition given in the invention, the defects inherent to the said copolymers cannot be removed even when heat-treated at the temperature within the Formula 1, and the objects of the invention cannot be achieved. Films and laminate films were made in the same manner as in Example 1. The results are given in Table 5.

titanate and tetrastearyl titanate. The so prepared four films, that is, the non heat-treated EVA film, heat-treated EVA film, non heat-treated laminate of EVA film and polyethylene film, and heat-treated laminate of EVA film and polyethylene film (laminate of the invention) were subjected to bag making and packing test at a heat-sealing temperature 155° C. The falling test and the transportation test were conducted with respect to the good articles only. The results are shown in Table 6.

TABLE 5

|  | Comparative Example | | | | | | | Example 12 |
|---|---|---|---|---|---|---|---|---|
|  | 1 | 2 | 3 | 4 | 5 | 6 | 7 | |
| Ethylene content of EVA, mole percent | 7.5 | 56 | 43 | 43 | 27 | 33 | 30 | 30 |
| Saponification degree of EVA, percent | 98.5 | 98.0 | 86.5 | 99.1 | 98.5 | 98.5 | 98.5 | 98.5 |
| Intrinsic viscosity of EVA, liter/gram | 0.15 | 0.07 | 0.11 | 0.04 | 0.28 | 0.10 | 0.11 | 0.11 |
| Thickness of EVA film, µ | 20 | 20 | 20 | 20 | 20 | 5 | 170 | 20 |
| Heat-treating temperature for EVA, ° C | 150 | 110 | 140 | 130 | 150 | 140 | 150 | 140 |
| Heat-treating time for EVA, seconds | 20 | 20 | 20 | 20 | 20 | 20 | 20 | 20 |
| Thickness of PE film having a melt index of 1.7 µ | 80 | 80 | 80 | 80 | 80 | 80 | 80 | 80 |
| Condition of extruded film of EVA | (¹) | Good | Good | Good | (¹) | (²) | Good | Good |
| Condition at the time of lamination of PE by extrusion | Good | (³) | (⁴) | (⁵) | Good | (⁶) | Good | Good |
| Defect ratio at the time of bag making and packaging test, percent | 3 | 30 | 20 | 30 | 3 | 20 | 10 | 3 |
| Breakage ratio, percent in the falling test | 30 | 73 | 40 | 100 | 0 | 50 | 0 | 0 |
| Breakage at the boundary line of the sealed portion | 0 | 53 | 15 | 10 | 0 | 15 | 0 | 0 |
| Breakage of other parts | 30 | 20 | 25 | 90 | 0 | 35 | 0 | 0 |
| Breakage ratio, percent in the transportation test | 20 | 37 | 35 | 80 | 25 | 32 | 12 | 0 |
| Breakage at the boundary line of the sealed portion | 5 | 30 | 20 | 10 | 10 | 25 | 2 | 0 |
| Breakage of other parts | 0 | 5 | 10 | 50 | 0 | 5 | 0 | 0 |
| Occurrence of pin holes | 15 | 2 | 5 | 20 | 15 | 2 | 10 | 0 |
| Others | | | (⁷) | | | (⁷) | | |

NOTE:
¹ Coloured by heat decomposition.
² Easy to break.
³ Considerable Shrinkage of EVA film in a widthwise direction at the time of lamination.
⁴ Considerable Shrinkage of EVA film in a widthwise direction at the time of lamination.
⁵ EVA film brittle and often broken.
⁶ EVA film often broken and considerable creasing.
⁷ Bad oxygen barrier.

TABLE 6

| | Comparative example | | | Example 13 |
|---|---|---|---|---|
| | 8 | 9 | 10 | |
| | Non heat-treated EVA film | Heat-treated EVA film | Non heat-treated EVA/PE laminate film | Heat-treated EVA/PE laminate film |
| Breakage ratio, percent at the time of the falling test | 100 | 100 | 70 | 0 |
| Breakage of the boundary line of sealed portion | 60 | 30 | 70 | 0 |
| Breakage of other parts | 40 | 70 | 0 | 0 |
| Breakage ratio at the time of the transportion test, percent | 100 | 80 | 50 | 0 |
| Breakage of the boundary line of sealed portion | 60 | 10 | 50 | 0 |
| Breakage of other portion | 40 | 60 | 0 | 0 |
| Pin holes | 0 | 10 | 0 | 0 |

We claim:

1. A laminate film wherein a polyethylene film having a thickness of 10–100μ is integrally laminated onto an ethylene/vinyl alcohol copolymer film having a thickness of 10–100μ, said ethylene/vinyl alcohol copolymer film consisting of a copolymer with an intrinsic viscosity of 0.05–0.20 l./g. obtained by saponifying a copolymer of 20–45 mole percent of ethylene and the remainder being vinyl acetate whereby at least 97% of vinyl acetate units is saponified, and said ethylene/vinyl alcohol copolymer film having been heat-treated for 1–60 seconds at a temperature within the range expressed by the following formula $$139.3 - 0.72X \leq Y \leq 221.7 - 1.59X$$

wherein Y is a temperature in ° C. to which the ethylene/vinyl alcohol copolymer is subjected, and X is a content in mole percent of ethylene in the ethylene/vinyl alcohol copolymer.

2. The laminate film according to claim 1 wherein the thickness of the said ethylene/vinyl alcohol copolymer film is 15–50μ.

3. The laminate film according to claim 1 wherein the thickness of the polyethylene film is 20–70μ.

4. The laminate film according to claim 1 wherein the polyethylene is a low density polyethylene having a melt index of 0.2–30 and a melting point of 108–120° C.

5. The laminate film according to claim 1 wherein a polypropylene film is laminated onto that surface of the ethylene/vinyl alcohol copolymer film whose side is not in contact with the polyethylene film.

6. The laminate film according to claim 1 wherein the ethylene/vinyl alcohol copolymer is heat-treated prior to the laminate of the ethylene/vinyl alcohol copolymer film onto the polyethylene film.

7. A process for the production of film containers free from a tendency of breakage at the boundary portion of the heat-sealing, which comprises heat-treating a film having a thickness of 10–100μ of an ethylene/vinyl alcohol copolymer with an intrinsic viscosity of 0.05–0.20 l./g. obtained by saponifying a copolymer of 20–45 mol precent of ethylene and the remainder being vinyl acetate whereby at least 97% of vinyl acetate units is saponified for 1–60 seconds at a temperature within the range expressed by the following formula $$139.3 - 0.72X \leq Y \leq 221.7 - 1.59X$$

wherein Y is a temperature in ° C. to which the ethylene/vinyl alcohol copolymer film is subjected, and X is a content in mole percent of ethylene in the ethylene/vinyl alcohol copolymer, laminating a polyethylene film having a thickness of 10–100μ onto the heat-treated ethylene/vinyl alcohol copolymer film, contacting the polyethylene layer side of the laminate film with each other, and heat-sealing said laminate films to make a container.

References Cited

UNITED STATES PATENTS

| 3,274,020 | 9/1966 | Heiberger et al. | 117—138.8 |
| 3,294,577 | 12/1966 | Mayer | 117—138.8 |
| 3,459,591 | 8/1969 | Konishi et al. | 161—254 |
| 3,483,076 | 12/1969 | Resz et al. | 161—256 |

JOHN T. GOOLKASIAN, Primary Examiner

G. W. MOXON II, Assistant Examiner

U.S. Cl. X.R.

53—39; 117—138.8, 161; 156—244, 292, 306, 322, 161—252, 254, 256